US012342821B2

United States Patent
Reinhard et al.

(10) Patent No.: US 12,342,821 B2
(45) Date of Patent: Jul. 1, 2025

(54) PESTICIDAL MIXTURES COMPRISING A PYRAZOLE COMPOUND

(71) Applicant: BASF SE, Ludwigshafen (DE)

(72) Inventors: Robert Reinhard, Limburgerhof (DE); Markus Gewehr, Limburgerhof (DE); Sebastian Soergel, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 890 days.

(21) Appl. No.: 17/429,445

(22) PCT Filed: Feb. 11, 2020

(86) PCT No.: PCT/EP2020/053463
§ 371 (c)(1),
(2) Date: Aug. 9, 2021

(87) PCT Pub. No.: WO2020/169414
PCT Pub. Date: Aug. 27, 2020

(65) Prior Publication Data
US 2022/0125050 A1   Apr. 28, 2022

(30) Foreign Application Priority Data
Feb. 20, 2019 (EP) ..................... 19158312

(51) Int. Cl.
*A01N 43/58* (2006.01)
(52) U.S. Cl.
CPC ................... *A01N 43/58* (2013.01)
(58) Field of Classification Search
CPC ...... A01N 43/58; A01N 43/40; A01N 43/653; A01N 43/80; A01P 3/00; A01P 5/00; A01P 7/02; A01P 7/04
See application file for complete search history.

(56) References Cited

FOREIGN PATENT DOCUMENTS

| | | |
|---|---|---|
| CN | 1456054 A | 11/2003 |
| CN | 1907024 A | 2/2007 |
| EP | 2865265 A1 | 4/2015 |
| EP | 3111763 A1 | 1/2017 |
| EP | 3329777 A1 | 6/2018 |
| WO | WO-2009/115557 A2 | 9/2009 |
| WO | WO-2011/80044 A2 | 7/2011 |
| WO | WO-2012/045798 A1 | 4/2012 |
| WO | WO-2012/069652 A2 | 5/2012 |
| WO | WO-2012/143317 A1 | 10/2012 |
| WO | WO-2012/146125 A1 | 11/2012 |
| WO | WO-2013/116251 A2 | 8/2013 |
| WO | WO-2013/127704 A1 | 9/2013 |
| WO | WO-2013/189801 A1 | 12/2013 |
| WO | WO-2014/060177 A1 | 4/2014 |
| WO | WO-2015/036379 A1 | 3/2015 |
| WO | WO-2015/065922 A1 | 5/2015 |
| WO | WO-2015/189080 A1 | 12/2015 |
| WO | WO-2015/197530 A2 | 12/2015 |
| WO | WO-2016/096849 A1 | 6/2016 |
| WO | WO-2016/096944 A1 | 6/2016 |
| WO | WO-2016/097003 A1 | 6/2016 |
| WO | WO-2016/109257 A1 | 7/2016 |
| WO | WO-2016/122802 A1 | 8/2016 |
| WO | WO-2016/128239 A1 | 8/2016 |
| WO | WO-2016/128240 A1 | 8/2016 |
| WO | WO-2016128261 A2 * | 8/2016 ............. A01N 43/58 |
| WO | WO-2016/139189 A1 | 9/2016 |
| WO | WO-2016/180802 A1 | 11/2016 |
| WO | WO-2016/187201 A2 | 11/2016 |
| WO | WO-2017/001252 A1 | 1/2017 |
| WO | WO-2017/008583 A1 | 1/2017 |
| WO | WO-2017/220491 A1 | 12/2017 |
| WO | WO-2018/041665 | 3/2018 |
| WO | WO-2018/046431 A1 | 3/2018 |
| WO | WO-2018/098216 A1 | 5/2018 |
| WO | WO-2018/098243 A1 | 5/2018 |
| WO | WO-2018/098245 A1 | 5/2018 |
| WO | WO-2018202737 A1 * | 11/2018 ........... A01N 43/653 |
| WO | WO-2018/234478 | 12/2018 |

OTHER PUBLICATIONS

National Center for Biotechnology Information, PubChem Compound Summary for CID 89968867, Dimpropyridaz, created on Feb. 13, 2015, retrieved on Mar. 21, 2023. URL—https://pubchem.ncbi.nlm.nih.gov/compound/Dimpropyridaz.
International Application No. PCT/EP2020/053463, International Search Report and Written Opinion, mailed Apr. 14, 2020.

\* cited by examiner

*Primary Examiner* — Monica A Shin
(74) *Attorney, Agent, or Firm* — MARSHALL, GERSTEIN & BORUN LLP

(57) ABSTRACT

Pesticidal mixtures comprising as active compounds 1) 1-[(1RS)-1,2-dimethylpropyl]-N-ethyl-5-methyl-N-pyridazin-4-yl-1H-pyrazole-4-carboxamide and 2) at least one further compound B selected from B.1) Succinate dehydrogenase inhibitors as defined in the specification; B.2) Inhibitors of oxysterol binding protein as defined in the specification; B.3) Inhibitors of complex III at Qi site selected from: a) florylpicoxamid, and b) fenpicox-amid; B.4) Strobilurins as defined in the specification; B.5) Inhibitors of C14-demethylase in sterol biosynthesis as defined in the specification; B.6) Inhibitors of cell division and cytoskeleton as defined in the specification, B.7) Other compounds of unknown mode of action as defined in the specification; and B.8) N-[[2-fluoro-4-[(2S,3S)-2-hydroxy-3-(3,4,5-trichlorophenyl)-3-(trifluoromethyl)pyrrolidin-1-yl]phenyl]methyl]cyclopropanecarboxamide; wherein component 1) and component 2) are present in a weight ratio of from 1000:1 to 1:1000; methods and use of these mixtures for combating invertebrate pests such as insects, arachnids, nematodes and/or harmful fungi in and on plants, and for protecting such plants being infested with pests and/or harmful fungi.

7 Claims, No Drawings

PESTICIDAL MIXTURES COMPRISING A PYRAZOLE COMPOUND

CROSS-REFERENCE TO RELATED APPLICATIONS

This is the U.S. national phase of International Application No. PCT/EP2020/053463, filed Feb. 11, 2020, which claims the benefit of European Patent Application No. 19158312.9, filed on Feb. 20, 2019.

The invention relates to synergistic pesticidal mixtures comprising as active compounds a pyrazole compound and at least one fungicide or insecticide.

The invention thus relates to pesticidal mixtures comprising as active compounds
1) 1-[(1RS)-1,2-dimethylpropyl]-N-ethyl-5-methyl-N-pyridazin-4-yl-1H-pyrazole-4-carboxamide of formula I (common name dimpropyridaz):

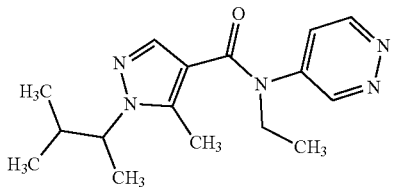

and
2) at least one further compound B selected from

B.1) Succinate dehydrogenase inhibitors selected from a) pydiflumetofen, b) pyraziflumid, c) inpyrfluxam, d) pyrapropoyne, e) fluindapyr, f) isoflucypram, g) 2-(difluoromethyl)-N-(1,1,3-trimethyl-indan-4 yl)pyridine-3-carboxamide, h) 2-(difluoromethyl)-N-[(3R)-1,1,3-trimethylindan-4-yl]pyridine-3-carboxamide, i) 2-(difluoromethyl)-N-(3-ethyl-1,1-dimethyl-indan-4-yl)pyridine-3-carboxamide, j) 2-(difluoromethyl)-N-[(3R)-3-ethyl-1,1-dimethyl-indan-4-yl]pyridine-3-carboxamide, k) 2-(difluoromethyl)-N-(1,1-dimethyl-3-propyl-indan-4-yl)pyridine-3-carboxamide, l) 2-(difluoromethyl)-N-[(3R)-1,1-dimethyl-3-propyl-indan-4-yl]-pyridine-3-carboxamide, m) 2-(difluoromethyl)-N-(3-isobutyl-1,1-dimethyl-indan-4-yl)¬pyridine-3-carboxamide, n) 2-(difluoromethyl)-N-[(3R)-3-isobutyl-1,1-dimethyl-indan-4 yl]pyridine-3-carboxamide, o) N-[2-[2-chloro-4-(trifluoromethyl)phenoxy]phenyl]-3-(difluoromethyl)-5-fluoro-1-methyl-pyrazole-4-carboxamide, and p) methyl (E)-2-[2-[(5-cyano-2-methyl-phenoxy)methyl]phenyl]-3-methoxy-prop-2 enoate;

B.2) inhibitors of oxysterol binding protein selected from a) oxathiapiprolin, b) 2-{3-[2-(1-{[3,5-bis(di¬fluoro¬methyl-1H-pyrazol-1-yl]acetyl}piperidin-4-yl)-1,3-thiazol-4-yl]-4,5-dihydro-1,2 oxazol-5-yl}¬phenyl methanesulfonate, c) 2-{3-[2-(1-{[3,5-bis(difluoro¬methyl)-1H-pyrazol-1-yl]¬acetyl}piperidin-4-yl) 1,3-thiazol-4-yl]-4,5-dihydro-1,2-oxazol-5 yl}-3-chlorophenyl methane¬sulfonate, d) 4-[1-[2-[3-(difluoromethyl)-5-methyl-pyrazol-1-yl]acetyl]-4-piperidyl]-N-te¬tralin-1-yl-pyridine-2-carboxamide, e) 4-[1-[2-[3,5-bis(difluoromethyl)pyrazol-1-yl]acetyl]-4-piperidyl]-N-tetralin-1-yl-pyridine-2-carboxamide, f) 4-[1-[2-[3-(difluoromethyl)-5-(tri¬fluoromethyl)pyrazol-1-yl]acetyl]-4-piperidyl]-N-tetralin-1-yl-pyri-dine-2-carboxamide, g) 4-[1-[2-[5-cyclopropyl-3-(difluoromethyl)pyrazol-1-yl]acetyl]-4-piperidyl]-N-tetralin-1-yl-pyri-dine-2-carboxamide, h) 4-[1-[2-[5-methyl-3-(trifluoromethyl)pyrazol-1-yl]acetyl]-4-pi¬peridyl]-N-tetralin-1-ylpyridine-2-carboxamide, i) 4-[1-[2-[5-(difluoromethyl)-3-(trifluoro¬methyl)pyrazol-1-yl]acetyl]-4-piperidyl]-N-tetralin-1-yl-pyridine-2-carboxamide, j) 4 [1 [2-[3,5-bis(trifluoromethyl)pyrazol-1-yl]acetyl]-4-piperidyl]-N-tetralin-1-yl-pyridine-2-carboxamide, and k) 4-[1-[2-[5-cyclopropyl-3-(trifluoromethyl)pyrazol-1-yl]acetyl]-4-piperidyl]-N-tetralin-1-yl-pyridine-2-carboxamide, B.3) Inhibitors of complex III at Qi site selected from: a) florylpicoxamid, and b) fenpicoxamid;

B.4) Strobilurins (inhibitors of complex III, Qo site) selected from a) (Z,2E) 5 [1-(2,4-dichloro¬phenyl)pyrazol-3-yl]-oxy-2-methoxyimino-N,3-dimethyl-pent-3-en¬amide, b) (Z,2E) 5 [1(4-chlorophenyl)pyrazol-3-yl]oxy-2-methoxyimino-N,3-dimethyl-pent-3-enamide, and c) 2-(ortho-((2,5-dimeth¬ylphenyl-oxy¬methylen)phenyl)-3-methoxy-acrylic acid methylester;

B.5) Inhibitors of C14-demethylase in sterol biosynthesis (DMI fungicides) selected from a) 2-(2,4-difluorophenyl)-1,1-difluoro-3-(tetrazol-1-yl)-1-[5-[4-(2,2,2-trifluoroethoxy)phenyl]-2 pyridyl]propan-2-ol, b) 2-(2,4-difluorophenyl)-1,1-difluoro-3-(tetrazol-1-yl)-1 [5 [4 (trifluoromethoxy)phenyl]-2-pyridyl]propan-2-ol, c) 2-(chloromethyl)-2-methyl-5-(p-tolylmethyl)-1 (1,2,4-triazol-1ylmethyl)cyclopentanol, d) 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile;

B.6) Inhibitors of cell division and cytoskeleton selected from a) Pyridachlometyl, b) N eth¬yl-2-[(3-ethynyl-8-methyl-6-quinolyl)oxy]butanamide, c) N-ethyl-2-[(3-ethynyl-8 methyl-6 quinolyl)oxy]-2-methylsulfanyl-acetamide, d) 2-[(3-ethynyl-8-methyl-6-quinol¬yl)oxy]-N(2-fluoroethyl)butanamide, e) 2-[(3-ethynyl-8-methyl-6-quinolyl)oxy]-N-(2-flu¬oroeth¬yl)-2-methoxyacetamide, f) 2-[(3-ethynyl-8-methyl-6-quinolyl)oxy]-N-propyl-butanam¬ide, g) 2-[(3-ethynyl-8-methyl-6-quinolyl)oxy]-2-methoxy-N-propyl-acetamide, h) 2-[(3-ethynyl-8-methyl-6-quinolyl)oxy]-2-methylsulfanyl-N-propyl-acetamide, i) 2 [(3 ethynyl-8-methyl-6-quinolyl)oxy]-N-(2-fluoroethyl)-2-methylsulfanyl-acetamide, j) 4-(2-bromo-4-fluoro-phenyl)-N-(2-chloro-6-fluorophenyl)-2,5-dimethyl-pyrazol-3 amine, B.7) Other compounds of unknown mode of action selected from a) diclocymet, b) fenitropan, c) harpin, d) picarbutrazox, e) dichlobentiazox, f) pyrifenamine, g) quinofumelin, h) ipflufenoquin, i) 4 cyclopropyl-N-(2,4-di¬methoxy¬phenyl)thiadiazole-5-carboxamide, j) N'-[4-[[3-[(4-chlorophenyl)methyl]-1,2,4-thiadiazol-5-yl]¬oxy]-2,5-dimethyl-phenyl]-N-ethyl-N-methyl-formamidine, k) N'-(5-bromo-6-indan-2-yl¬oxy-2-methyl-3-pyridyl)-N-ethyl-N-methyl-formamidine, l) N'-[5-bromo-6-[1-(3,5-diflu¬orophenyl)ethoxy]-2-methyl-3-pyridyl]-N-ethyl-N-methylformamidine, m) N'-[5-bromo-6-(4-isopropylcyclohexoxy)-2-methyl-3-pyridyl]-N-ethyl-N-methyl-formamidine, n) N' [5 bromo-2-methyl-6-(1-phenylethoxy)-3-pyridyl]-N-ethyl-N-methylformamidine, o) ethyl (Z) 3 amino-2-cyano-3-phenyl-prop-2-enoate, p) pentyl N-[6-[[(Z)-[(1-methyltetrazol-5-yl)-phenyl-methylene]amino]oxy¬methyl]-2-pyridyl]carbamate, q) but-3-ynyl N-[6-

[[(Z)-[(1-methyltetrazol-5-yl)-phenyl-methylene]amino]oxy-methyl]-2-pyridyl]carbamate (picarbutrazox), r) 2-(6-benzyl-2-pyridyl)quinazoline, s) 2-[6-(3-fluoro-4 methoxy-phenyl)-5-methyl-2-pyridyl]quinazoline, t) N'-(2,5-dimethyl-4-phen-oxy-phenyl)-N-ethyl-N-methylformamidine, and B.8) N-[[2-fluoro-4-[(2S,3S)-2-hydroxy-3-(3,4,5-trichlorophenyl)-3-(trifluoromethyl)pyrrolidin-1-yl]phenyl]methyl]cyclopropanecarboxamide;

wherein component 1) and component 2) are present in a weight ratio of from 1000:1 to 1:1000.

One typical problem arising in the field of pest control lies in the need to reduce the dosage rates of the active ingredient in order to reduce or avoid unfavorable environmental or toxicological effects whilst still allowing effective pest control. Another problem encountered concerns the need to have available pest control agents which are effective against a broad spectrum of pests or crop diseases.

Another difficulty in relation to the use of pesticides is that the repeated and exclusive application of an individual pesticidal compound leads in many cases to a rapid selection of pests and harmful fungi which have developed natural or adapted resistance against the active compound in question. Therefore there is a need for pest control agents that help prevent or overcome resistance.

Compound of formula I is known from WO 2012/143317. This compound is mentioned to be useful for combating invertebrate pests.

It is therefore an object of the invention to provide pesticidal mixtures which solve at least one of the discussed problems as reducing the dosage rate, enhancing the spectrum of activity or combining knock-down activity with prolonged control or as to resistance management.

It has been found that at least one of these objectives is achieved by the combination of active compounds defined in the outset.

Moreover, it has also been found that simultaneous, that is joint or separate, application of dimpropyridaz and one or more active compounds B or successive application of dimpropyridaz and one or more active compounds B allows enhanced control of pests and/or harmful fungi compared to the control rates that are possible with the individual compounds.

Moreover, the invention relates to an agricultural composition comprising the pesticidal mixture as defined herein and at least one inert liquid and/or solid acceptable carrier;

a method for controlling or combating invertebrate pests, comprising contacting said pest or its food supply, habitat, breeding grounds with a pesticidally effective amount of the pesticidal mixture as defined herein;

the use of the pesticidal mixture as defined herein for protecting growing plants or plant propagation material from attack or infestation by invertebrate pests;

a method for controlling phytopathogenic harmful fungi, wherein the fungi, their habitat or the plants to be protected against fungal attack, the soil or seed are treated with an effective amount of the pesticidal mixture comprising dimpropyridaz and at least one specific compound B;

a method for protecting plants from phytopathogenic harmful fungi, wherein the fungi, their habitat or the plants to be protected against fungal attack, the soil or seed are treated with an effective amount of the pesticidal mixture comprising dimpropyridaz and at least one specific compound B; and The mixtures of the invention may be a physical mixture of dimpropyridaz and the at least one compound B. Accordingly, the invention also provides a mixture comprising dimpropyridaz and at least one compound B. However, the composition may also be any combination of dimpropyridaz with at least one compound B, it not being required for compound A and B to be present together in the same formulation.

The term "invertebrate pest" (also referred to as animal pests) as used herein encompasses animal populations, such as insects, arachnids and nematodes, which may attack plants, thereby causing substantial damage to the plants attacked.

The term "compound(s) according to the invention", or "compound of formula I" or "pyrazole compound A" comprises dimpropyridaz as defined herein as well as a stereoisomer, salt, tautomer or N-oxide thereof.

Dimpropyridaz has one center of chirality; it is present as mixture of enantiomers. The invention provides both the pure enantiomers or diastereomers and their mixtures and the use according to the invention of the pure enantiomers of dimpropyridaz or its mixtures.

The commercially available further compounds B may be found in The Pesticide Manual, 17th Edition, British Crop Protection Council (2015) among other publications, and its online database https://www.bcpc.org/product/bcpc-online-pesticide-manual-latest-version. Compounds B1 to B8, resp., and their fungicidal or pesticidal action are known from CN 1456054, WO2017008583, CN 1907024, WO2015197530, WO2016097003, WO2016139189, WO2016096944, WO2016096849, WO2017220491, WO2018046431, WO2016109257, WO2016122802, WO 2016187201, WO2018098216, WO2018098243, WO2018098245, WO 2014/60177, WO2013116251, WO 2015036379, WO13127704, WO2015/65922, WO 2011/80044, WO2012/146125, WO 2009115557, WO2012045798, WO2012/69652, EP2865265, and WO2016/180802, resp.

We have found that simultaneous, that is joint or separate, application of dimpropyridaz and at least one compound B or successive application of dimpropyridaz and at least one compound B allows better control of animal pests and/or harmful fungi than is possible with the individual compounds alone (synergistic mixtures).

Dimpropyridaz can be used as synergist for different fungicidal active compounds. By simultaneous, that is joint or separate, application of dimpropyridaz with at least one active compound B1 to B7, the fungicidal activity is increased in a superadditive manner. By simultaneous, that is joint or separate, application of dimpropyridaz with compound B8, the insecticidal activity is increased in a superadditive manner.

The remarks made below concerning preferred embodiments of the variables further are valid on their own as well as preferably in combination with each other concerning dimpropyridaz, where applicable, as well as concerning the uses and methods according to the invention and the mixtures of the invention.

Particular aspects of the invention are any one of pesticidal mixtures A, B, C, D, E, F, G, and H:

Pesticidal Mixture a Comprises as Active Components
A1) dimpropyridaz, and
A2) Succinate dehydrogenase inhibitors selected from the group B.2 as defined in the outset;
wherein component A1) and component A2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

Preferred mixtures A are combinations of dimpropyridaz with a compound B selected from: pydiflumetofen, inpyrfluxam, pyrapropoyne, isoflucypram, 2-(difluoromethyl)-N-(1,1,3-trimethylindan-4 yl)pyridine-3-carboxamide, 2-(difluoromethyl)-N-[(3R)-1,1,3-trimethylindan-4-yl]pyridine-3-carboxamide, 2-(difluoromethyl)-N-(3-ethyl-1,1-dimethyl-indan-4-yl)pyridine-3-carboxamide, 2-(difluoromethyl)-N-[(3R)-3-ethyl-1,1-dimethyl-indan-4-yl]pyridine-3-carboxamide, 2-(difluoromethyl)-N-(1,1-dimethyl-3-propyl-indan-4-yl)pyridine-3-carboxamide, 2-(difluoromethyl)-N-[(3R)-1,1-dimethyl-3-propyl-indan-4-yl]-pyridine-3-carboxamide, 2-(difluoromethyl)-N-(3-isobutyl-1,1-dimethyl-indan-4-yl)¬pyridine-3-carboxamide, and 2-(difluoromethyl)-N-[(3R)-3-isobutyl-1,1-dimethylindan-4-yl]pyridine-3-carboxamide in the mixture ratios as mentioned above.

In another embodiment preferred mixtures A are combinations of dimpropyridaz with a compound B selected from: A2 a) to A2 n) as defined in the outset in the mixture ratios as mentioned above.

Pesticidal Mixture B Comprises as Active Components
1) dimpropyridaz, and
B2) inhibitors of oxysterol binding protein selected from the group B.2 as defined in the outset;
wherein component 1) and component B2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

Preferred mixtures B are combinations of dimpropyridaz with a compound B selected from: oxathiapiprolin, and 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate in the mixture ratios as mentioned above.

In another embodiment preferred mixtures B are combinations of dimpropyridaz with a compound B selected from B.2 a) to B.2 c) as defined in the outset in the mixture ratios as mentioned above. In yet another embodiment preferred mixtures E are combinations of dimpropyridaz with a compound B selected from B2 d), B2 h), and B2 t) as defined in the outset in the mixture ratios as mentioned above.

Pesticidal Mixture C Comprises as Active Components
C1) dimpropyridaz, and
C2) a) florylpicoxamid, or b) fenpicoxamid;
wherein component C1) and component C2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

A preferred mixture C is the combination of dimpropyridaz with florylpicoxamid in the mixture ratios as mentioned above.

Pesticidal Mixture D Comprises as Active Components
D1) dimpropyridaz, and
D2) Strobilurins selected from the group B.4 as defined in the outset;
wherein component D1) and component D2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

Preferred mixtures D are combinations of dimpropyridaz with a compound B selected from: (Z,2E)-5-[1-(2,4-dichlorophenyl)pyrazol-3-yl]-oxy-2-methoxyimino-N,3-dimethyl-pent-3-enamide, and (Z,2E)-5-[1-(4-chlorophenyl)pyrazol-3-yl]oxy-2-methoxyimino-N,3-dimethyl-pent-3-enamide in the mixture ratios as mentioned above.

Pesticidal Mixture E Comprises as Active Components
E1) dimpropyridaz, and
E2) DMI fungicides selected from the group B.5 as defined in the outset;
wherein component E1) and component E2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

A preferred mixture E is the combination of dimpropyridaz with 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile in the mixture ratios as mentioned above.

Pesticidal Mixture F Comprises as Active Components
F1) dimpropyridaz, and
F2) Inhibitors of cell division and cytoskeleton selected from the group B.6 as defined in the outset;
wherein component F1) and component F2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

A preferred mixture F is the combination of dimpropyridaz with pyridachlometyl in the mixture ratios as mentioned above.

Pesticidal Mixture G Comprises as Active Components
G1) dimpropyridaz, and
G2) Other compounds of unknown mode of action selected from the group B.6 as defined in the outset;
wherein component G1) and component G2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

Preferred mixtures G are combinations of dimpropyridaz with a compound B selected from: Picarbutrazox, quinofumelin, ipflufenoquin, and N'-(2,5-dimethyl-4-phenoxy-phenyl)-N-ethyl-N-methyl-formamidine in the mixture ratios as mentioned above.

Pesticidal Mixture H Comprises as Active Components
H1) dimpropyridaz, and
H2) N-[[2-fluoro-4-[(2S,3S)-2-hydroxy-3-(3,4,5-trichlorophenyl)-3-(trifluoromethyl)pyrrolidin-1-yl]phenyl]methyl]cyclopropanecarboxamide;
wherein component H1) and component H2) are present in a total weight ratio of from 1000:1 to 1:1000, preferably 100:1 to 1:100, particularly 20:1 to 1:20. In the afore mentioned ratios one embodiment relates to ratios from 1:1 to excessive dimpropyridaz; in another embodiment the ratios are from 1:1 to excessive compound B.

Binary mixtures of dimpropyridaz and a compound B are one preferred embodiment of the invention.

The mixtures of the invention are particularly suitable for controlling Lepidoptera, Coleoptera, Diptera, Thysanoptera, and Hemiptera.

In particular the mixtures are useful for the control of Thysanoptera and Hemiptera, especially Hemiptera.

In a preferred embodiment the invention relates to the pesticidal mixtures A to H which are particularly suitable for controlling pests from the family of Pentatomidae and/or Cicadellidae and/or Aleyrodidae and/or Aphididae, which are typical pests on soybean plants.

In one preferred embodiment, the invention relates to the use or method comprising the application of the pesticidal mixtures as defined above, wherein the pests are selected from the group consisting of green stink bug (*Acrosternum hilare*), brown marmorated stink bug (*Halyomorpha halys*), redbanded stink bug (*Piezodorus guildinii*), neotropical brown stink bug (*Euschistus heros*), brown stink bug (*Euschistus servus*), kudzu bug (*Megacopta cribraria*), red-shouldered stink bug (*Thyanta custator*) and the dusky-brown stink bug (*Euschistus tristigmus*), the southern green stink bug (*Nezara viridula*), and combinations thereof.

In one embodiment the stinkbug target is *Nezara viridula, Piezodorus* spp., *Acrosternum* spp. *Euschistus* and in particular *Euschistus heros* are the preferred targets. More preferably the pesticidal mixtures are used to control Pentatomidae including green stink bug (*Acrosternum hilare*), brown marmorated stink bug (*Halyomorpha halys*), redbanded stink bug (*Piezodorus guildinii*), neotropical brown stink bug (*Euschistus heros*), brown stink bug (*Euschistus servus*), and kudzu bug (*Megacopta cribraria*), red-shouldered stink bug (*Thyanta custator*), duskybrown stink bug (*Euschistus tristigmus*), and southern green stink bug (*Nezara viridula*).

The pesticidal mixtures A to H are preferably used on Faboideae, in particular soybean, to control stinkbugs, e.g. *Nezara* spp. (e.g. *Nezara viridula, Nezara antennata, Nezara hilaris*), *Piezodorus* spp. (e.g. *Piezodorus guildinii*), *Acrosternum* spp. (e.g. *Acrosternum hilare*), *Euchistus* spp. (e.g. *Euschistus heros, Euschistus servus*), *Halyomorpha halys, Megacopta cribaria, Plautia crossota, Riptortus clavatus, Rhopalus msculatus, Antestiopsis orbitalus, Dectes texanus, Dichelops* spp. (e.g. *Dichelops furcatus, Dichelops melacanthus*), *Eurygaster* spp. (e.g. *Eurygaster intergriceps, Eurygaster maurd*), *Oebalus* spp. (e.g. *Oebalus mexicana, Oebalus poecilus, Oebalus pugnase, Scotinophara* spp. (e.g. *Scotinophara lurida, Scotinophara coarctatd*).

Preferred targets include *Acrosternum hilare, Antestiopsis orbitalus, Dichelops furcatus, Dichelops melacanthus, Euchistus heros, Euschistus servus, Megacopta cribaria, Nezara viridula, Nezara hilare, Piezodorus guildinii, Halyomorpha halys*.

Further Pentatomidae pests that can be controlled according to the invention are *Eysarcoris*, in particular *Eysarcoris aeneus*.

The mixtures are preferably used on Faboideae, in particular soybean, to control whiteflies, e.g. sweetpotato whitefly (*Bemisia tabaci*).

The mixtures are preferably used on Faboideae, in particular soybean, to control aphids, e.g. soybean aphid (*Aphis glycines*).

The mixtures are preferably used on Faboideae, in particular soybean, to control leafhoppers, e.g. potato leafhopper (*Empoasca fabae*).

The mixtures are preferably used on Faboideae, in particular soybean, to control leafhoppers, e.g. Lorito verde (small green pakeet) (*Empoasca kraemen*).

The pesticidal mixtures A to H are preferably used to control lepidopterans (Lepidoptera), such as *Spodoptera frugiperda, Spodoptera littoralis, Spodoptera litura*; beetles (Coleoptera), such as *Anthonomus grandis, Anthonomus pomorum*, and thrips (Thysanoptera), such as *Scirtothrips citri*.

The mixtures of the invention and compositions thereof, resp., are particularly suitable for controlling the following plant diseases:

*Albugo* spp. (white rust) on ornamentals, vegetables (e. g. *A. candida*) and sunflowers (e. g. *A. tragopogonis*); *Alternaria* spp. (*Alternaria* leaf spot) on vegetables (e.g. *A. dauci* or *A. porri*), oilseed rape (*A. brassicicola* or *brassicae*), sugar beets (*A. tenuis*), fruits (e.g. *A. grandis*), rice, soybeans, potatoes and tomatoes (e. g. *A. solani, A. grandis* or *A. alternata*), tomatoes (e. g. *A. solani* or *A. alternata*) and wheat (e.g. *A. triticina*); *Aphanomyces* spp. on sugar beets and vegetables; *Ascochyta* spp. on cereals and vegetables, e. g. *A. tritici* (anthracnose) on wheat and *A. hordei* on barley; *Aureobasidium zeae* (syn. *Kapatiella zeae*) on corn; *Bipolaris* and *Drechslera* spp. (teleomorph: *Cochliobolus* spp.), e. g. Southern leaf blight (*D. maydis*) or Northern leaf blight (*B. zeicola*) on corn, e. g. spot blotch (*B. sorokiniana*) on cereals and e. g. *B. oryzae* on rice and turfs; *Blumeria* (formerly *Erysiphe*) *graminis* (powdery mildew) on cereals (e. g. on wheat or barley); *Botrytis cinerea* (teleomorph: *Botryotinia fuckeliana*: grey mold) on fruits and berries (e. g. strawberries), vegetables (e. g. lettuce, carrots, celery and cabbages); *B. squamosa* or *B. allii* on onion family), oilseed rape, ornamentals (e.g. *B. eliptica*), vines, forestry plants and wheat; *Bremia lactucae* (downy mildew) on lettuce; *Ceratocystis* (syn. *Ophiostoma*) spp. (rot or wilt) on broad-leaved trees and evergreens, e. g. *C. ulmi* (Dutch elm disease) on elms; *Cercospora* spp. (*Cercospora* leaf spots) on corn (e. g. Gray leaf spot: *C. zeae-maydis*), rice, sugar beets (e. g. *C. beticola*), sugar cane, vegetables, coffee, soybeans (e. g. *C. sojina* or *C. kikuchii*) and rice; *Cladobotryum* (syn. *Dactylium*) spp. (e.g. *C. mycophilum* (formerly *Dactylium dendroides*, teleomorph: *Nectria albertinii, Nectria rosella* syn. *Hypomyces rosellus*) on mushrooms; *Cladosporium* spp. on tomatoes (e. g. *C. fulvum*: leaf mold) and cereals, e. g. *C. herbarum* (black ear) on wheat; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*, anamorph: *B. sorokiniana*) and rice (e. g. *C. miyabeanus*, anamorph: *H. oryzae*); *Colletotrichum* (teleomorph: *Glomerella*) spp. (anthracnose) on cotton (e. g. *C. gossypi*), corn (e. g. *C. graminicola*: Anthracnose stalk rot), soft fruits, potatoes (e. g. *C. coccodes*: black dot), beans (e. g. *C. lindemuthianum*), soybeans (e. g. *C. truncatum* or *C. gloeosporioides*), vegetables (e.g. *C. lagenarium* or *C. capsici*), fruits (e.g. *C. acutatum*), coffee (e.g. *C. coffeanum* or *C. kahawae*) and *C. gloeosporioides* on various crops; *Corticium* spp., e. g. *C. sasakii* (sheath blight) on rice; *Corynespora cassiicola* (leaf spots) on soybeans and ornamentals; *Cycloconium* spp., e. g. *C. oleaginum* on olive trees; *Cylindrocarpon* spp. (e. g. fruit tree canker or young vine decline, teleomorph: *Nectria* or *Neonectria* spp.) on fruit trees, vines (e. g. *C. liriodendri*, teleomorph: *Neonectria liriodendri*: Black Foot Disease) and ornamentals; *Dematophora* (teleomorph: *Roselinia*) *necatrix* (root and stem rot) on soybeans; *Diaporthe* spp., e. g. *D. phaseolorum* (damping off) on soybeans; *Drechslera* (syn. *Helminthosporium*, teleomorph: *Pyrenophora*) spp. on corn, cereals, such as barley (e. g. *D. teres*, net blotch) and wheat (e. g. *D. tritici-repentis*: tan spot), rice and turf; Esca (dieback, apoplexy) on vines, caused by Formitiporia (syn. *Phellinus*) punctata, *F. mediterranea, Phaeomoniella chlamydospora* (formerly *Phaeoacremonium chlamydosporum*), *Phaeoacremonium aleophilum* and/or *Botryosphaeria obtusa; Elsinoe* spp. on pome fruits (*E. pyri*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e. g. *E. pisi*), such as cucurbits (e. g. *E. cichoracearum*), cabbages, oilseed rape (e. g. *E. cruciferarum*); *Eutypa lata* (*Eutypa* canker or dieback, anamorph: *Cytosporina lata*, syn. *Libertella blepharis*) on fruit trees, vines and ornamental woods; *Exserohilum* (syn. *Helminthosporium*) spp. on corn (e. g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* (f. sp. glycines now syn. *F. virguliforme*) and *F. tucumaniae* and *F. brasiliense* each causing sudden death syndrome on soybeans, and *F. verticillioides* on corn; *Gaeumannomyces graminis* (take-all) on cereals (e. g. wheat or barley) and corn; *Gibberella* spp. on cereals (e. g. *G. zeae*) and rice (e. g. *G. fujikuroi*: Bakanae disease); *Glomerella cingulata* on vines, pome fruits and other plants and *G. gossypii* on cotton; Grain-staining complex on rice; *Guignardia bidwellii* (black rot) on vines; *Gymnosporangium* spp. on rosaceous plants and junipers, e. g. *G. sabinae* (rust) on pears; *Helminthosporium* spp. (syn. *Drechslera*, teleomorph: *Cochliobolus*) on corn, cereals, potatoes and rice; *Hemileia* spp., e. g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; Microdochium (syn. *Fusarium*) *nivale* (pink snow mold) on cereals (e. g. wheat or barley); *Microsphaera diffusa* (powdery mildew) on soybeans; *Monilinia* spp., e. g. *M. laxa, M. fructicola* and *M. fructigena* (syn. *Monilia* spp.: bloom and twig blight, brown rot) on stone fruits and other rosaceous plants; *Mycosphaerella* spp. on cereals, bananas, soft fruits and ground nuts, such as e. g. *M. graminicola* (anamorph: *Zymoseptoria triticiformerly Septoria tritici: Septoria* blotch) on wheat or *M. fijiensis* (syn. *Pseudocercospora fijiensis*: black Sigatoka disease) and *M. musicola* on bananas, *M. arachidicola* (syn. *M. arachidis* or *Cercospora arachidis*), *M. berkeleyi* on peanuts, *M. pisi* on peas and *M. brassiciola* on brassicas; *Peronospora* spp. (downy mildew) on cabbage (e. g. *P. brassicae*), oilseed rape (e. g. *P. parasitica*), onions (e. g. *P. destructor*), tobacco (*P. tabacina*) and soybeans (e. g. *P. manshurica*); *Phakopsora pachyrhizi* and *P. meibomiae* (soybean rust) on soybeans; *Phialophora* spp. e. g. on vines (e. g. *P. tracheiphila* and *P. tetraspora*) and soybeans (e. g. *P. gregata*: stem rot); *Phoma* lingam (syn. *Leptosphaeria biglobosa* and *L. maculans*: root and stem rot) on oilseed rape and cabbage, *P. betae* (root rot, leaf spot and damping-off) on sugar beets and *P. zeae-maydis* (syn. *Phyllostica zeae*) on corn; *Phomopsis* spp. on sunflowers, vines (e. g. *P. viticola*: can and leaf spot) and soybeans (e. g. stem rot: *P. phaseoli*, teleomorph: *Diaporthe phaseolorum*); *Physoderma maydis* (brown spots) on corn; *Phytophthora* spp. (wilt, root, leaf, fruit and stem root) on various plants, such as paprika and cucurbits (e. g. *P. capsici*), soybeans (e. g. *P. megasperma*, syn. *P. sojae*), potatoes and tomatoes (e. g. *P. infestans*: late blight) and broad-leaved trees (e. g. *P. ramorum*: sudden oak death); *Plasmodiophora brassicae* (club root) on cabbage, oilseed rape, radish and other plants; *Plasmopara* spp., e. g. *P. viticola* (grapevine downy mildew) on vines and *P. halstedii* on sunflowers; *Podosphaera* spp. (powdery mildew) on rosaceous plants, hop, pome and soft fruits (e. g. *P. leucotricha* on apples) and curcurbits (*P. xanthii*); *Polymyxa* spp., e. g. on cereals, such as barley and wheat (*P. graminis*) and sugar beets (*P. betae*) and thereby transmitted viral diseases; *Pseudocercosporella herpotrichoides* (syn. *Oculimacula yallundae, O. acuformis*: eyespot, teleomorph: *Tapesia yallundae*) on cereals, e. g. wheat or barley; *Pseudoperonospora* (downy mildew) on various plants, e. g. *P. cubensis* on cucurbits or *P. humili* on hop; *Pseudopezicula tracheiphila* (red fire disease or, rotbrenner', anamorph: *Phialophora*) on vines; *Puccinia* spp. (rusts) on various plants, e. g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye, *P. kuehnii* (orange rust) on sugar cane and *P. asparagi* on asparagus; *Pyrenopeziza* spp., e.g. *P. brassicae* on oilseed rape; *Pyrenophora* (anamorph: *Drechslera*) *tritici-repentis* (tan spot) on wheat or *P. teres* (net blotch) on barley; *Pyricularia* spp., e. g. *P. oryzae* (teleomorph: *Magnaporthe grisea*: rice blast) on rice and *P. grisea* on turf and cereals; *Pythium* spp. (damping-off) on turf, rice, corn, wheat, cotton, oilseed rape, sunflowers, soybeans, sugar beets, vegetables and various other plants (e. g. *P. ultimum* or *P. aphanidermatum*) and *P. oligandrum* on mushrooms; *Ramularia* spp., e. g. *R. collo-cygni* (*Ramularia* leaf spots, Physiological leaf spots) on barley and *R. beticola* on sugar beets; *Rhizoctonia* spp. on cotton, rice, potatoes, turf, corn, oilseed rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* and *R. commune* (scald) on barley, rye and triticale; *Sarocladium oryzae* and *S. attenuatum* (sheath rot) on rice; *Sclerotinia* spp. (stem rot or white mold) on vegetables (*S. minor* and *S. sclerotiorum*) and field crops, such as oilseed rape, sunflowers (e. g. *S. sclerotiorum*) and soybeans, *S. rolfsii* (syn. *Athelia rolfsii*) on soybeans, peanut, vegetables, corn, cereals and ornamentals; *Septoria* spp. on various plants, e. g. *S. glycines* (brown spot) on soybeans, *S. tritici* (syn. *Zymoseptoria tritici, Septoria* blotch) on wheat and *S.* (syn. *Stagonospora*) *nodorum* (*Stagonospora* blotch) on cereals; *Uncinula* (syn. *Erysiphe*) *necator* (powdery mildew, anamorph: *Oidium tuckeri*) on vines; *Setosphaeria* spp. (leaf blight) on corn (e. g. *S. turcicum*, syn. *Helminthosporium turcicum*) and turf; *Sphacelotheca* spp. (smut) on corn, (e. g. *S. reiliana*, syn. *Ustilago reiliana*: head smut), sorghum und sugar cane; *Sphaerotheca fuliginea* (syn. *Podosphaera xanthii*: powdery mildew) on cucurbits; *Spongospora subterranea* (powdery scab) on potatoes and thereby transmitted viral diseases; *Stagonospora* spp. on cereals, e. g. *S. nodorum* (*Stagonospora* blotch, teleomorph: *Leptosphaeria* [syn. *Phaeosphaeria*] *nodorum*, syn. *Septoria nodorum*) on wheat; *Synchytrium endobioticum* on potatoes (potato wart disease); *Taphrina* spp., e. g. *T. deformans* (leaf curl disease) on peaches and *T. pruni* (plum pocket) on plums; *Thielaviopsis* spp. (black root rot) on tobacco, pome fruits, vegetables, soybeans and cotton, e. g. *T. basicola* (syn. *Chalara elegans*); *Tilletia* spp. (common bunt or stinking smut) on cereals, such as e. g. *T. tritici* (syn. *T. caries*, wheat bunt) and

*T. controversa* (dwarf bunt) on wheat; *Trichoderma harzianum* on mushrooms; *Typhula incarnata* (grey snow mold) on barley or wheat; *Urocystis* spp., e. g. *U. occulta* (stem smut) on rye; *Uromyces* spp. (rust) on vegetables, such as beans (e. g. *U. appendiculatus*, syn. *U. phaseoli*), sugar beets (e. g. *U. betae* or *U. beticola*) and on pulses (e.g. *U. vignae, U. pisi, U. viciae-fabae* and *U. fabae*); *Ustilago* spp. (loose smut) on cereals (e. g. *U. nuda* and *U. avaenae*), corn (e. g. *U. maydis*: corn smut) and sugar cane; *Venturia* spp. (scab) on apples (e. g. *V. inaequalis*) and pears; and *Verticillium* spp. (wilt) on various plants, such as fruits and ornamentals, vines, soft fruits, vegetables and field crops, e. g. *V. longisporum* on oilseed rape, *V. dahliae* on strawberries, oilseed rape, potatoes and tomatoes, and *V. fungicola* on mushrooms; *Zymoseptoria tritici* on cereals.

The mixtures of the invention can be converted into customary types of agrochemical compositions, e. g. solutions, emulsions, suspensions, dusts, powders, pastes, granules, pressings, capsules, and mixtures thereof. These and further compositions types are defined in the "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

The mixtures of the invention are employed as such or in form of compositions by treating the insects, the fungi or the plants, plant propagation materials, such as seeds, soil, surfaces, materials or rooms to be protected from insecticidal or fungal attack with a pesticidally effective amount of the active compounds. The application can be carried out both before and after the infection of the plants, plant propagation materials, such as seeds, soil, surfaces, materials or rooms by the insects.

The invention also includes a method of combating animal pests and harmful fungi which comprises contacting the fungi and/or animal pests, their habit, breeding ground, food supply, cultivated plants, seed, soil, area, material or environment in which the animal pests are growing or may grow, or the materials, plants, seeds, soils, surfaces or spaces to be protected from animal attack or infestation with a pesticidally effective amount of a mixture according to the invention.

Dimpropyridaz and the one or more compound(s) B are usually applied in a weight ratio of from 1000:1 to 1:1000, preferably from 100:1 to 1:100, or from 20:1 to 1:20, in particular from 10:1 to 1:10.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures and/or compositions used in the invention. A pesticidally effective amount of the mixtures and/or compositions will also vary according to the prevailing conditions such as desired pesticidal effect and duration, weather, target species, locus, mode of application, and the like.

EXAMPLES

The invention is now illustrated in further details by the following examples.

Synergism can be described as an interaction where the combined effect of two or more compounds is greater than the sum of the individual effects of each of the compounds. The presence of a synergistic effect in terms of percent control or efficacy, between two mixing partners (X and Y) can be calculated using the Colby equation (Colby, S. R., 1967, Calculating Synergistic and Antagonistic Responses in Herbicide Combinations Weeds, 15, 20-22):

$$E = X + Y - \frac{XY}{100}$$

The measured parameters were compared to the growth of the active compound-free control variant (100%) and the fungus-free blank value to determine the relative growth in % of the pathogens in the respective active compounds. These percentages were converted into efficacies.

An efficacy of 0 means that the growth level of the pathogens corresponds to that of the untreated control; an efficacy of 100 means that the pathogens were not growing.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

The following tests can demonstrate the control efficacy of mixtures or compositions of this invention on specific fungi. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests and/or harmful fungi.

The active compounds were formulated separately as a stock solution having a concentration of 10000 ppm in dimethyl sulfoxide.

The product oxathiapiproline was used as commercial finished formulation and diluted with water to the stated concentration of the active compound.

1. Activity Against the Late Blight Pathogen *Phytophthora infestans* in the Microtiter Test The stock solutions were mixed according to the ratio, pipetted onto a micro titer plate (MTP) and diluted with water to the stated concentrations. A spore suspension of *Phytophtora infestans* containing a pea juice-based aqueous nutrient medium or 000 medium was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 0.063 | — | 4 | | |
|  | 0.016 | — | 0 | | |
| Oxathiapiproline B.5) a) | 0.063 | — | 11 | | |
|  | 0.016 | — | 0 | | |
| Dimpropyridaz | 0.063 | 1:1 | 45 | 15 | 30 |
| Oxathiapiproline | 0.063 | | | | |
| Dimpropyridaz | 0.063 | 4:1 | 65 | 4 | 61 |
| Oxathiapiproline | 0.016 | | | | |
| Dimpropyridaz | 0.016 | 1:4 | 40 | 11 | 29 |
| Oxathiapiproline | 0.063 | | | | |

2. Activity Against the Grey Mold *Botrytis cinerea* in the Microtiterplate Test The stock solutions were mixed according to the ratio, pipetted onto a micro titer plate (MTP) and diluted with water to the stated concentrations. A spore suspension of *Botrci cinerea* in an aqueous biomalt or yeast-bactopeptone-sodiumacetate solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 1 | — | 0 | | |
|  | 0.25 | — | 1 | | |
|  | 0.063 | — | 0 | | |
| Pydiflumetofen B.2 a) | 0.063 | — | 42 | | |
| Isoflucypram B.2 f) | 0.25 | — | 57 | | |
| Pyrapropoyne B.2 d) | 1 | — | 26 | | |
| Dimpropyridaz | 0.063 | 1:1 | 60 | 42 | 18 |
| Pydiflumetofen | 0.063 | | | | |
| Dimpropyridaz | 0.25 | 4:1 | 70 | 43 | 27 |
| Pydiflumetofen | 0.063 | | | | |
| Dimpropyridaz | 0.25 | 1:1 | 81 | 57 | 24 |
| Isoflucypram | 0.25 | | | | |
| Dimpropyridaz | 1 | 4:1 | 73 | 57 | 16 |
| Isoflucypram | 0.25 | | | | |
| Dimpropyridaz | 0.063 | 1:4 | 78 | 57 | 21 |
| Isoflucypram | 0.25 | | | | |
| Dimpropyridaz | 0.25 | 1:4 | 45 | 27 | 18 |
| Pyrapropoyne | 1 | | | | |

3. Activity Against Leaf Blotch on Wheat Caused by *Septoria tritici*

The stock solutions were mixed according to the ratio, pipetted onto a micro titer plate (MTP) and diluted with water to the stated concentrations. A spore suspension of *Septoria tritici* in an aqueous biomalt or yeast-bactopeptone-glycerine or DOE solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 0.25 | — | 7 | | |
|  | 0.063 | — | 5 | | |
| Isoflucypram B.2) f) | 0.063 | — | 40 | | |
| Dimpropyridaz | 0.063 | 1:1 | 81 | 43 | 38 |
| Isoflucypram | 0.063 | | | | |
| Dimpropyridaz | 0.25 | 4:1 | 74 | 44 | 30 |
| Isoflucypram | 0.063 | | | | |

4. Activity Against *Cercospora* Sojina in the Microtiter Test

The stock solutions were mixed according to the ratio, pipetted onto a micro titer plate (MTP) and diluted with water to the stated concentrations. A spore suspension of *Cercospora sojina* in an aqueous biomalt or yeast-bactopeptone-sodiumacetate solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 63 | — | 23 | | |
| | 0.25 | — | 0 | | |
| Florylpicoxamid B.3)a) | 16 | — | 61 | | |
| | 0.25 | — | 6 | | |
| Dimpropyridaz Florylpicoxamid | 0.25 0.25 | 1:1 | 29 | 6 | 23 |
| Dimpropyridaz Florylpicoxamid | 63 16 | 4:1 | 100 | 70 | 30 |

5. Activity Against *Colletotrichum orbiculare* in the Microtiterplate Test

The stock solutions were mixed according to the ratio, pipetted onto a micro titer plate (MTP) and diluted with water to the stated concentrations. A spore suspension of *Colletotricum orbiculare* in an aqueous biomalt or yeast-bactopeptone-sodiumacetate solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 63 | — | 14 | | |
| Pydiflumetofen B.1) a) | 16 | — | 59 | | |
| Dimpropyridaz Pydiflumetofen | 63 16 | 4:1 | 96 | 65 | 31 |

6. Activity Against *Rhynchosporium secalis* in the Microtiterplate Test

The stock solutions were mixed according to the ratio, pipetted onto a micro titer plate (MTP) and diluted with water to the stated concentrations. A spore suspension of *Rhynchosporium secalis* in an aqueous biomalt or yeast-bactopeptone-glycerine or DOE solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 63 | — | 12 | | |
| B.5)d) | 63 | — | 70 | | |
| Dimpropyridaz B.5)d) | 63 63 | 1:1 | 92 | 74 | 18 |

7. Activity Against *Sclerotinia sclerotiorum* in the Microtiterplate Test

The stock solutions were mixed according to the ratio, pipetted onto a micro titer plate (MTP) and diluted with water to the stated concentrations. A spore suspension of *Sclerotinia* sclerotiorum in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

| Active compound/ active mixture | Concentration (ppm) | Mixture | Observed efficacy | Calculated efficacy (%) | Synergism (%) |
|---|---|---|---|---|---|
| Dimpropyridaz | 0.25 | — | 0 | | |
| Pyrapropoyne B.1)d) | 1 | — | 27 | | |
| Dimpropyridaz | 0.25 | 1:4 | 48 | 27 | 21 |
| Pyrapropoyne | 1 | | | | |

The invention claimed is:

1. A pesticidal mixture comprising as active components
1) 1-(1,2-dimethylpropyl)-N-ethyl-5-methyl-N-pyridazin-4-yl-pyrazole-4-carboxamide of formula I:

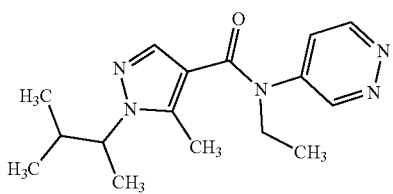

and
2) at least one further compound B selected from
B.1) Succinate dehydrogenase inhibitors selected from the group consisting of a) pydiflumetofen, b) pyraziflumid, c) inpyrfluxam, d) pyrapropoyne, e) fluindapyr, f) isoflucypram, g) 2-(difluoromethyl)-N-(1,1,3-trimethyl-indan-4 yl)pyridine-3-carboxamide, h) 2-(difluoromethyl)-N-[(3R)-1,1,3-trimethylindan-4-yl]pyridine-3-carboxamide, i) 2-(difluoromethyl)-N-(3-ethyl-1,1-dimethyl-indan-4-yl)pyridine-3-carboxamide, j) 2-(difluoromethyl)-N-[(3R)-3-ethyl-1,1-dimethyl-indan-4-yl]pyridine-3-carboxamide, k) 2-(difluoromethyl)-N-(1,1-dimethyl-3-propyl-indan-4-yl)pyridine-3-carboxamide, l) 2-(difluoromethyl)-N-[(3R)-1,1-dimethyl-3-propyl-indan-4-yl]-pyridine-3-carboxamide, m) 2-(difluoromethyl)-N-(3-isobutyl-1,1-dimethyl-indan-4-yl)-pyridine-3-carboxamide, n) 2-(difluoromethyl)-N-[(3R)-3-isobutyl-1,1-dimethyl-indan-4 yl]pyridine-3-carboxamide, o) N-[2-[2-chloro-4-(trifluoromethyl)phenoxy]phenyl]-3-(difluoromethyl)-5-fluoro-1-methyl-pyrazole-4-carboxamide, and p) methyl (E)-2-[2-[(5-cyano-2-methyl-phenoxy)methyl]phenyl]-3-methoxy-prop-2 enoate;
wherein component 1) and component 2) are present in a weight ratio of from 1000:1 to 1:1000.

2. The mixture of claim 1, wherein component 1) and component 2) are present in a weight ratio of from 100:1 to 1:100.

3. The mixture of claim 1, wherein component 1) and component 2) are present in a weight ratio of from 20:1 to 1:20.

4. The mixture of claim 1, wherein component 1) and component 2) are present in a weight ratio of from 10:1 to 1:10.

5. The mixture of claim 1 comprising one compound B.1).

6. A method for controlling phytopathogenic harmful fungi, comprising contacting the fungi, their habitat, plants to be protected against fungal attack, soil, or seeds with an effective amount of the pesticidal mixtures according to claim 1.

7. A method for protecting growing plants or plant propagation materials from attack or infestation by invertebrate pests, comprising contacting the plants, the plant propagation materials, or soil or water in which the plants are growing, with a pesticidally effective amount of the pesticidal mixtures according to claim 1.

* * * * *